United States Patent

[11] 3,617,367

| [72] | Inventor | Lowell O. Cummings<br>San Anselmo, Calif. |
|------|----------|---------------------------|
| [21] | Appl. No. | 696,988 |
| [22] | Filed | Jan. 11, 1968 |
| [45] | Patented | Nov. 2, 1971 |
| [73] | Assignee | Pacific Vegetable Oil Corporation<br>San Francisco, Calif.<br>Continuation-in-part of application Ser. No. 586,381, Oct. 13, 1966, now abandoned. |

[54] POLYISOCYANATE-POLYAMINE COATING COMPOSITION
4 Claims, No Drawings

[52] U.S. Cl. .................................................. 117/161LN,
94/1.5, 117/105.5, 117/132 8, 117/148,
117/161 KP, 117/161 UT, 260/18 TN, 260/77.5
CH, 260/77.5 AA, 260/830 R, 260/858

[51] Int. Cl. ......................................................... C08g 22/02

[50] Field of Search .......................................... 260/77.5
CH, 757 NH, 77.5 AM, 18 TN, 22 TN, 835, 858;
117/105.5

[56] References Cited
UNITED STATES PATENTS

| 3,345,311 | 10/1967 | Ehrlich et al. | 260/18 |
|-----------|---------|----------------|--------|
| 3,321,548 | 5/1967 | Sattler | 260/47 X |
| 3,281,396 | 10/1966 | Barnes | 260/75 |
| 3,194,793 | 7/1965 | Kogon | 260/77.5 |
| 3,097,192 | 7/1963 | Schilit | 260/75 |
| 2,995,531 | 8/1961 | Hudson | 260/18 |
| 2,379,413 | 7/1945 | Bradley | 260/404.5 |
| 3,483,150 | 12/1969 | Ehrlich | 260/18 |
| 3479,325 | 11/1969 | Blomeyer | 260/18 X |
| 3,256,213 | 6/1966 | Gmitter et al. | 260/2.5 |
| 2,450,940 | 10/1948 | Cowan | 260/18 X |

FOREIGN PATENTS

| 661,523 | 4/1963 | Canada | 260/77.5 |
|---------|--------|--------|----------|

OTHER REFERENCES

" Synopsis of Versamide Seminar"; Chemical Div. General Mills; Feb. 1958; page 25

" DDi Brand Diisocyanate General Data Sheet"; CDS 8-65; Commercial Development Dept. Chemical Division, General Mills; 1965, pages 1– 6.

*Primary Examiner*—Donald E. Czaja
*Assistant Examiner*—C. Warren Ivy
*Attorney*—Owen, Wickersham & Erickson ABSTRACT: A cured coating comprising the reaction of the product between a polyamine and certain polyisocyanates, including polyester polyisocyanates and aromatic and aliphatic isocyanates, with the ratio of amine groups to polyisocyanate groups lying to the range of 3:1 to 1:3. Also a two-system spray system for forming rapid cure coatings of that type.

POLYISOCYANATE-POLYAMINE COATING COMPOSITION

This application is a continuation-in-part of application Ser. No. 586,381, filed Oct. 13, 1966, now abandoned.

There are many places where the slow cure of drying of paints and other coating compositions cause difficulties. Delay in cure or drying necessitates not only waiting but careful handling of freshly coated materials and space where they can be held apart from other bodies. Moreover, it is not always feasible to achieve rapid cure by baking. Some materials that are to be coated do not withstand baking well, and baking necessarily consumes power and entails later cooling.

The present invention relates to a system wherein the coating cures very rapidly at room temperature.

The system of this invention is very adaptable to use in a production line, where pieces are handled a few minutes after spraying.

The system of this invention does not require further processing to cure the film. Other types of finishes require long drying times, or baking for curing, or in a few cases very expensive curing processes such as electron beam curing or other forms of radiation curing.

As my new process does not require heat and cures rapidly, it is especially adaptable to use in coating wood pieces which are to be stacked. Wood is affected by heat and cannot be subjected to extensive baking without the risk of changing the wood properties. Up to now it has been difficult to obtain fast cured coating on wood without resorting to baking or more exotic curing systems such as radiation curing.

In coating wood with primers intended for exterior use, it is recognized that a primer with a vehicle containing vegetable oils (e.g. linseed oil) has the best durability and resistance to cracking. Oils have good flexibility and have unsurpassed resistance to cracking on wood. The primer recognized throughout the exterior wood paint industry as the standard of excellence is Federal Specification TT-P-25a, a linseed oil based primer. This primer takes about 2 days of air drying before it is suitable for topcoating. The lumber industry is now marketing preprimed and prefinished siding for the home builders. The lumber industry in cooperation with the paint industry has long been striving to develop a long-lasting factory-applied primer for this siding.

Primers have already been in production which are based on short oil alkyds. These have been deficient in resistance to cracking, as shown by many actual exposures. Furthermore, with short oil alkyd primers, baking has been required in order to obtain fast enough cure so that the primed siding could be stacked without sticking together at the end of the production line. This baking has been undesirable but, with the short oil alkyds, has been unavoidable.

One of the main uses anticipated for the rapid-curing primer of this invention is for factory-applied wood priming. My new rapid-curing primer can be made from components which are made from drying oils and therefore can impart the same resistance to wood cracking, due to their oil-type flexibility, as conventional oil based air dry primers such as TT-P-25a.

On the other hand, my new rapid-curing primers can alternatively be made from more resinous components, such as alkyds and epoxy resin derivatives. These harder coatings are suitable for coating steel.

In fact these primers of this invention appear to give the steel rust resistance, due to amines in my new coating, for amines are known to aid rust resistance of coatings for steel.

There are many other instances where a rapid-cure no-baking primer for steel or other metal is useful, e.g. where baking is too expensive or not permitted, in applications on exterior structures where no baking is available, and where rapid topcoating is desirable. All that is needed is two separate spray guns with their accompanying paint reservoirs. These coatings may also be useful in traffic paints where virtually no waiting period is necessary for the paint to dry before traffic can pass.

Other objects and advantages of the invention will appear from the following description of some preferred forms thereof.

Basically, the invention is a coating formed by spraying a surface simultaneously with (a) a polyamine and (b) a polyisocyanate.

POLYAMINES

A polyamine, as the term is used herein, means any organic compound which contains two or more amine groups either primary or secondary groups.

The simplest polyamine is ethylene diamine, $H_2NCH_2CH_2NH_2$. Higher homologs of this are diethylene triamine, $H_2NCH_2CH_2NHCH_2CH_2NH_2$, and triethylene tetramine, $H_2NCH_2CH_2(NHCH_2CH_2)_2NH_2$. These simple polyamines can be used as the polyamine of this invention, but less volatile polyamines are better. For example, I have made high-molecular-weight polyamines that give excellent results herein by reacting tung acrolein adduct or epoxy resins with the simple polyamines shown above, where one aldehyde or epoxy group reacts with only one amine group of the polyamine, leaving one or more amine groups free.

The tung acrolein adduct reaction may be diagrammed as:

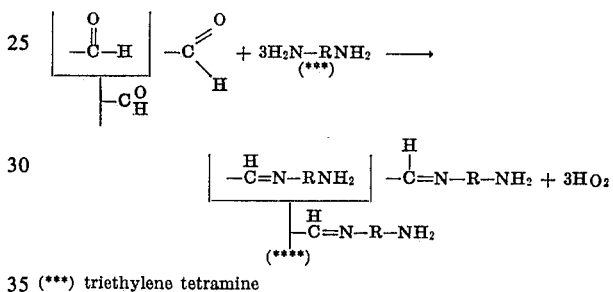

(***) triethylene tetramine
(****) Tung oil acrolein polyamine

It is important to react one aldehyde with one amine group only of the polyamine. To react two amine groups gives a polymer rather than the desired high-molecular-weight polyamine.

The chemical reaction between an amine and an aldehyde is known as Schiff's base reaction, a powerful reaction which takes place rapidly at room temperature and goes very nearly to completion even in the presence of water. It will drive itself to completion in the presence of an excess of water, which is also a product of reaction. The reaction is illustrated in detail as:

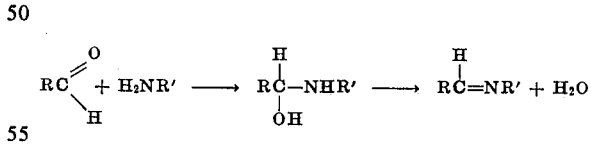

EXAMPLE 1

Making tung acrolein adduct:

2,500 g. tung oil is rapidly stirred in a glass kettle fitted with a reflux condenser. The oil is heated to 150° C. (302° F.) and 490 grams of acrolein is slowly added over an 18 hour period. The reaction gives a light tan oil, viscosity 9 Stokes, Gardner color 6 to 7, acid value 3.9 and carboxyl equivalent of 0.198/100 g.

This reaction product is then condensed with a simple polyamine to get the higher molecular weight polyamine desired. For example, 50 grams of isopropyl alcohol, 100 grams of toluene, and 30.7 grams of triethylene tetramine are mixed in that order and to them are added slowly 100 grams of the tung-acrolein adduct, all at room temperature and atmospheric pressure. The reaction takes about an hour to produce the desired polyamine.

An example of an epoxy resin-simple polyamine reaction to make a higher molecular weight polyamine is:

$$H_2C\overset{O}{-\!\!\!-\!\!\!-}CH-CH_2-O-\underset{}{\underset{}{\bigcirc}}-\underset{CH_3}{\overset{CH_3}{C}}-\underset{}{\underset{}{\bigcirc}}-O-CH_2-CH\overset{O}{-\!\!\!-\!\!\!-}CH_2 + 2H_2NCH_2CH_2NH_2 \longrightarrow$$

(Lowest molecular weight member of)
(epichlorhydrin-bisphenol epoxy resin)      (ethylene diamine)

$$H_2NCH_2CH_2NH-CH_2-\underset{}{\overset{OH}{C}H}-CH_2-O-\underset{}{\underset{}{\bigcirc}}-\underset{CH_3}{\overset{CH_3}{C}}-\underset{}{\underset{}{\bigcirc}}-O-CH_2-\underset{}{\overset{OH}{C}H}-CH_2-NHCH_2CH_2NH_2$$

Note that again only one amine group of each ethylene diamine is reacted with the epoxy group, in order to leave a free amine group. This reaction is not as vigorous as the Schiff's base reaction and does not take place rapidly at room temperature.

Another polyamine that works very well in the fast-curing coating reactions of this invention is the type of resin called a "polyamide" resin. One brand of these is "Versamid" resins produced by General Mills. In actuality, they are amide-amine resins made from reacting dimer fatty acids and simple polyamines such as ethylene diamine, diethylene triamine, triethylene tetramine, and so on. These can be represented by:

$$HO-\overset{O}{\overset{\|}{C}}-\cdots-\overset{O}{\overset{\|}{C}}-OH-HNCH_2CH_2NH_2 \longrightarrow$$
(dimer acid) (ethylene diamine)

$$H_2N-CH_2-CH_2\overset{\text{amine group}}{\overset{\downarrow}{N}H}-\overset{O}{\overset{\|}{C}}-\underset{\text{amide groups}}{\underbrace{\cdots-\overset{O}{\overset{\|}{C}}-NH-CH_2CH_2NH-\overset{O}{\overset{\|}{C}}-\cdots}}-\overset{O}{\overset{\|}{C}}-\overset{\downarrow}{N}H-CH_2-CH_2-\overset{\text{amine group}}{\overset{\downarrow}{N}H_2}$$

Another polyamine useful in this invention is made by reacting a bodied drying oil with methanol and then reacting the resulting methyl ester with a suitable amine.

EXAMPLE 2

Making a polyamide-amine employing a methyl ester of a bodied safflower oil:

Safflower oil bodied to Z-8 Gardner-Holt viscosity is used, 3,233 parts by weight being mixed with 610 parts by weight of methanol which contains 39 parts by weight of sodium hydroxide. After thorough mixing for about 30 minutes in a kettle containing a reflux condenser and stirrer, in an inert atmosphere such as nitrogen, the mixture is neutralized, as by adding a mixture of 60 parts by weight of sulfuric acid and 60 parts by weight of water. The resulting mixture is allowed to settle, a lower layer then separates out, is drained off, and glycerine recovered therefrom.

The resulting methyl ester of bodied safflower oil is washed, as by washing with hot water three times, until the water layer is approximately neutral. The yield should be about 100 percent of the oil weight charged; the viscosity is A-2 Gardner-Holt and the color 5 to 7. 4

The methyl ester of bodied safflower oil is then charged to a kettle, preferably of stainless steel fitted with a stirrer, an inert gas inlet tube, a distilling condenser, and a methanol receiver. To 3,040 parts by weight of the ester are added 960 parts by weight of triethylene tetramine, and the mixture is stirred and heated in four hours to about 210° C. with a gentle stream of nitrogen sparge. The yield of safflower oil methyl ester polyamine-amine is 3,650 parts by weight, with about 331 parts by weight of distillate.

The color of the polyamide-amine is 7–, its viscosity is Z-7 to Z-8, its amine number is about 200 (plus or minus 10), its specific gravity is 0.95 or 7.82 pounds per gallon.

EXAMPLE 3

Preparation of dimer acid methyl esters:

A polyamine similar to the one of example 2 but with a higher content of dimer acids can be made as follows: 3,000 parts by weight of methyl ester of safflower oil fatty acid (iodine value 144, viscosity A-3 (6 centistokes), acid value <1.0, Gardner color 10) is heated and stirred to about 575° F. in a glass flask under a carbon dioxide atmosphere. At this point sulfur dioxide is bubbled through the methyl esters at a rate of 1 cubic foot per hour. The temperature is maintained at 575° F. for about 10 hours. At this point a gas-liquid chromatographic analysis shows that virtually all the monomeric linoleic acid esters (78 percent of the safflower methyl esters) has disappeared forming dimer acid methyl esters and small amounts of higher homologs such as trimer acid methyl esters. The sulfur dioxide is shut off, and a fast stream of carbon dioxide is introduced to drive off any dissolved sulfur dioxide. This material has a color of 8, viscosity of C to D, acid value of 7.

EXAMPLE 4

Preparation of polyamide-amine from the high-dimer-content methyl ester of example 3:

The product obtained from example 3 is reacted with triethylene tetramine in exactly the same manner as that described in example 2 using the same portions of amine and methyl ester. The same yield is obtained.

This polyamide-amine has the following properties:
Color—8–9
Viscosity—1,650 Stokes
Amine number—205
Specific Gravity—0.97, 8.1 lbs./gal.

EXAMPLE 5

Preparation of aromatic polyamide-amine from the methyl ester of example 3:

1,500 grams of the higher dimer content methyl ester obtained from example 3 is heated with 1,000 grams of p, p' methylene dianiline in a glass flask fitted with a stirrer, thermometer and distillation condenser. A small nitrogen stream is bubbled through the reactants while it is heated and stirred to 450° F. Methanol evolves at this point, and the heat is carried to 500° F. and held for the remainder of the reaction. After about 2 hours of 140 cc. distillate evolves, which is mostly methanol.

The reaction product weighs 2,382 grams, has an amine value of 143 (thymol blue end point, titrated in isopropanol with HCl). It is a soft semicrystalline solid of light tan color.

EXAMPLE 6

Preparation of an aromatic polyamide-amine from the methyl ester of example 3, and an aromatic polyamine with higher functionality than methylene dianiline:

In the same manner as in example 5, 2,000 grams of the higher dimer content methyl ester of example 3 is heated in a glass flask with 1,333 grams of a polyamine. This polyamine is derived from aniline and formaldehye to give a mixture of methylene dianiline and higher homologs. It has a functionality of 2.4 and an equivalent weight of 103. The temperature is raised to 420° F., at which point methanol is evolved. The temperature is raised to 450° F. and held there during the methanol evolution. 181 grams of distillate evolves after 6 hours, at which time the reaction is discontinued.

The reaction product weighs 3,128 grams. It has an amine value of 120 and a specific gravity of 1.03 (8.6 lbs./gal.). It is a clear solid resin with a Gardner color of 11, at first. After standing a day or so the material becomes semicrystalline, but can easily be brought to the clear state by mild heating.

THE POLYESTER POLYISOCYANATE-POLYAMINE REACTION

A vigorous reactant with polyamines is a polyisocyanate. The two groups have a powerful affinity for each other, so strong that the two will preferentially react together even in the presence of alcohol groups, which also react strongly with isocyanate groups.

The isocyanate group reacts with primary and secondary amine groups to give substituted ureas.

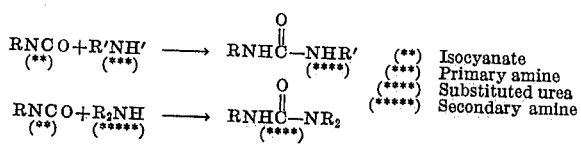

(\*\*) Isocyanate
(\*\*\*) Primary amine
(\*\*\*\*) Substituted urea
(\*\*\*\*\*) Secondary amine For this purpose polyisocyanates-polyurethanes that contain ester groups have been used, or in some cases polyiso-

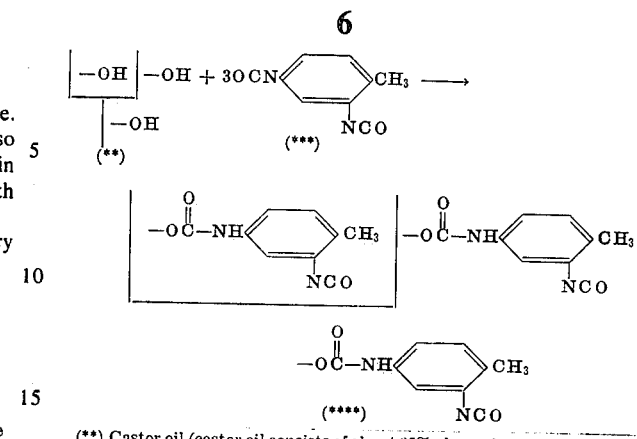

(\*\*) Castor oil (castor oil consists of about 85% glycerol ester of ricinoleic acid which has one hydroxy group per fatty acid).
(\*\*\*) Toluene diisocyanate.
(\*\*\*\*) Castor oil-toluene diisocyanate adduct with free NCO groups.

This in turn is reacted with a polyamine in the two-spray system.

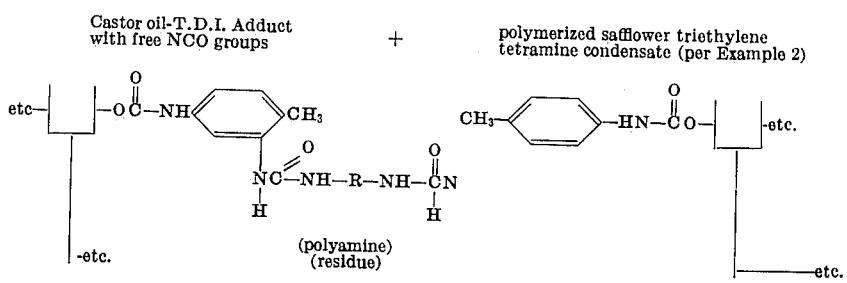

cyanates which contained no other groups. Polyisocyanates which contained ether groups have not been used because ether groups in a film tend to contribute water sensitiveness and also poor weathering properties. Also the reactive products of this type of the invention contain a substantial amount of fatty acid derivatives and dimerized fatty acid derivatives. The long carbon chain found in fatty acids contributes to good film formation. Vehicles containing long-chain fatty acids are used throughout the coating industry.

Therefore the reacted films of this invention contain polyureas, polyurethanes and polyesters but not polyethers. This contrasts with French Pat. No. 1,427,722 in which thick solid polymers containing polyether, polyurethane and polyurea groups are made by spraying together polyether polyisocyanates and aromatic amines.

The present invention is centered on using polyesters-polyisocyanates which are reacted with polyamide-amines or polyamines, both of aliphatic and aromatic nature. These react together by being sprayed from two guns, each separate from one another.

French Pat. No. 1,427,722 states that its spraying system can be done with either an internal or external mixture spray gun, but in the process of this invention only externally mixed spray guns are possible, due to the fast reaction. The French Pat. No. 1,427,722 also emphasizes the use of high solids materials (e.g. 100 percent solids for the polyether-polyisocyanate and the aromatic amine at 40 percent solids, the two being sprayed in a 100/40 ration). The materials of the present invention are sprayed at relatively low solids, e.g. 25 percent solids for each component.

To prepare the polyisocyanate I have used castor oil, (an ester) and other oils. It was reacted with one mole of toluene diisocyanate per hydroxy group in the castor oil. This is essentially a triisocyanate (or polyisocyanate) which is reactive with polyamines to form polymers.

Only one reactive group on two castor oils are shown here for brevity. It can be seen that this can result in a high molecular weight polymer. The best ratios are one free NCO group to each $RNH_2$ or $R_2NH$ group of the polyamine.

The castor oil and toluene diisocyanate adduct is made as follows:

EXAMPLE 7

A mixture of 133 grams of toluene diisocyanate and 200 grams of toluene are placed in a 1-liter glass flask fitted with paddle stirrer, thermometer and water cooled condenser and a dropping funnel for addition of the castor oil solution.

A mixture of 267 grams of castor oil, number 1 grade, and 200 grams of toluene are placed in the dropping funnel and added to the toluene diisocyanate solution over a period of about 45 minutes. During this time the temperature of the reaction rises from 28° C. to 55° C.

The cooled solution of castor oil toluene diisocyanate reaction product has a viscosity of about 0.2 stokes and a Gardner color of 2 to 3.

THE METHOD OF APPLYING THE COATING

To explain the mode of the reaction as presently understood, the two reactants are mixed as quickly and as thoroughly as possible in a few seconds. During this mixing, the reactants are at first mutually soluble in each other for a brief instant and then they start to form a polymer. The polymer forms spontaneously at room temperature.

To test the reactants quickly, one of the reactants may be weighed into a small container, such as a paper cup or breaker. Then the second reactant is weighed into the same container, being careful not to mix the components. Then the components are mixed with a spatula as rapidly and as thoroughly as possible. Within 10 seconds of mixing the mixture becomes very viscous, and within less than a minute the mixture becomes completely gelled and impossible to stir.

The above test indicates the suitability of the reactants to be used as a coating. Films of these reactants are preferably made by simultaneously spraying the two components from two separate spray guns on the same area.

The sprayed droplets of the two components first mix and form a film on the sprayed surface, or perhaps some droplets mix while still traveling in the air. The film begins to harden almost at once. Typically the film will become solid and cured enough to be handled in a minute or two at room temperature.

The components are usually dissolved in a suitable solvent to give the optimum spraying properties. Usually the spraying viscosity is quite low. Much of the solvent evaporates in the spray, and the remainder evaporates from the film. The film hardens even though there is some solvent remaining. The evaporation of the solvent can be hastened by a heat source heating the film, but this is not necessary.

While clear coatings are quite good with this system, either of the two components can, of course, be pigmented to give paints. After suitable formulating, the resulting paints have the appearance of conventional paint.

EXAMPLE 8

Coatings from castor oil toluene diisocyanate and polyamine from tung acrolein adduct condensed with triethylene tetramine:

The castor oil-toluene diisocyanate adduct solution shown in example 7 is here used as solution (B). A tung oil acrolein adduct condensed with triethylene tetramine solution is used as solution (A), as follows:

The condensation product may be made by mixing 307 parts by weight of triethylene tetramine and 650 parts by weight of n-propanol and 650 parts by weight of toluene in a stirred reaction flask at room temperature. Then 1,000 parts by weight of the tung acrolein adduct are added over an hour's time, raising the temperature from 25° C. to 34° C., making a clear tan colored solution (A).

These were sprayed at a rate of 60 grams per minute for (A) and 80 grams per minute for (B) on test panels with two separate spray guns. Two conventional paint spray guns may be used. The reservoir of one gun is filled with solution (A) and the other with solution (B). These are connected to air lines with 30 lbs./sq. inch pressure. The guns are attached together so that their nozzles are pointed toward the same point about 3 inches in front of the nozzles. Each gun is adjusted so that each sprays out 60 grams of solution per minute. Then they are sprayed at the same time on a test panel, holding the guns about 3 inches from the panel. A film of combined (A) and (B) forms immediately on spraying. A very fast curing film was deposited. The film was somewhat grainy in structure but very tough and flexible. Adhesion to the substrate was poor for the first few seconds, but adhesion became very good in a few minutes.

EXAMPLE 9

Coating from example 4 materials but adding formic acid to (B) to obtain a smoother film:

When the procedure shown in example 8 is duplicated, except that to solution (A) 10 percent of 88 percent solution of formic acid is added, the cure of the film is slowed slightly so that the film coalesces better, resulting in a much smoother and uniform film than the one from example 8.

EXAMPLE 10

Limits of the polyisocyanate-polyamine ratio:

Tests indicate that the ratio of the number of isocyanate groups to the number of amine groups should lie within the range of 1:3 and 3:1. Beyond these limits, the two-spray system fails to form a nonliquid film, producing merely a viscous liquid mix rather like either of the two viscous components.

The following mixtures indicate what happens at some ratios. The isocyanate is the castor oil toluene diisocyanate adduct solution of example 7, and the polyamine is the polyamine of the methyl ester of bodied safflower oil of example 2. Both ingredients were simultaneously sprayed (as in example 8) on to test panels of standard cardboard paint-out charts. The results are thus noted.

| | Ratio of amine groups to isocyanate groups | Results |
| --- | --- | --- |
| (a) | 1:5 | Sticky film that did not completely cure. |
| (b) | 1:2.5 | Tough cured film with some tackiness. |
| (c) | 1:1.43 | Very tough film, completely tack-free five minutes after spraying. |
| (d) | 1:1 | Same as (c) |
| (e) | 2:1 | Fairly tough film with some tackiness. |

EXAMPLE 11

Exposure tests:

A method for finding the worth of primers intended for exterior wood surfaces is by coating the primers on one side of panels of douglas fir plywood. These panels are then exposed to the weather at 45° from vertical facing south. Uncoated plywood exposed in this manner will develop grain raising in a week or two. The raised grain areas will evolve into pronounced cracks in several weeks. Primers can be evaluated on their ability to prevent this grain raising and cracking when coated over portions of the plywood.

Primers made from the two-spray rapid-curing system using polyisocyanates and polyamines have been exposed on plywood in the above manner. As controls the same panels were coated with two primers which are now being used commercially in factory-coating wood. These are based on short-oil alkyds and were baked on the plywood panel under infrared lamps for 30 minutes.

The polyisocyanate-polyamine primers were not subjected to heat, but were cured at room temperature within 3 minutes well enough to withstand 20 pounds per square inch without blocking.

The two spray solutions were as follows:

Solution A (Polyamine)

| Ingredient | Parts by weight |
| --- | --- |
| Tung oil acrolein-triethylene tetramine, solution of Example 8 | 164 |
| Pigment (titanium dioxide, china clay and silica) | 180 |
| Toluene | 180 |
| Total | 224 |

Solution B (Polyisocyanate)

| Ingredient | Parts by weight |
| --- | --- |
| Castor oil-toluene diisocyanate adduct, solution of Example 7 | 180 |
| Pigment (titanium dioxide, china clay and silica) | 180 |
| Toluene | 180 |
| Total | 540 |

Each mixture was ground in a paint mill and was placed in the reservoir of separate spray guns, and the output from the two guns were sprayed together on the plywood at 30 pounds pressure at a rate of 80 grams per minute for (B) and 60 grams per minute for (A). The primer was sprayed at about 3 mils dry-film thickness on a portion of a douglas fir plywood panel beside strips of the two commercial factory-coating primers of 2 to 3 mils thickness baked on as shown above.

The panel was exposed to weather in the manner indicated above for 109 days. The panel was then examined and evaluated as shown below.

1. Polyisocyanate-Polyamine Primer: Top half of film had no cracks or grain raising. Lower half had grain raising and some cracks.

2. Alkyd Primer No. 1: Grain raising over entire panel. Some cracking near edges.

3. Alkyd Primer No. 2: Medium amount of grain cracking over whole surface.

EXAMPLE 12

| Indgredients | Parts by weight |
| --- | --- |
| Component A | |
| Polyamine of Example 2 | 1 |
| Toluene | 1 |
| Isopropanol | 1 |
| Component B | |
| Mondur MR, crude p,p'-diphenylmethyl diisocyanate (30% NCO, Eq. wt. about 140) | 1 |
| Toluene | 5 |
| Rate of spray: A. 10 g./15 sec.; B. 10 g./15 sec. | |

This made a smooth satin texture finish that was tough and nontacky in a minute. It passed the 1,000 g. Hoffman scratch hardness within 1 minute of spraying.

EXAMPLE 13

| Ingredients | Parts by weight |
| --- | --- |
| Component A | |
| Polyamine of Example 2 | 1 |
| Toluene | 1 |
| Methyl ethyl ketone | 1 |
| Component B | |
| General Mills DDI Aliphatic diisocyanate derived from dimeric fatty acids—14% NCO, Eq. wt. 300 | 1 |
| Toluene | 1 |
| Rate of spray: A. 15 g./15 sec.; B. 10 g./15 sec. | |

A clear, cured, slightly tacky film was formed at once which resembled an air-dried oil film.

EXAMPLE 14

| Ingredient | Parts by weight |
| --- | --- |
| Component A | |
| p,p'-methylenedianiline (4,4'-diaminodiphenylmethane) | 1 |
| Toluene | 1 |
| Isopropanol | 1 |
| Methyl ethyl ketone | 1 |
| Component B | |
| Castor oil toluene diisocyanate condensate of Example 7, 50% solids | 1 |
| Toluene | 1 |
| Rate of spray: A. 7.0 g./15 sec.; B. 32 g./15 sec. | |

This made an excellent glossy hard tough film. It set up within 30 seconds but had time to level out before setting up. It passed the 1,000 g. Hoffman scratch hardness test in 5 minutes, when sprayed on a cardboard test panel.

When sprayed on glass about 1-mil dry-film thickness, three samples tested as follows:

| Sward Hardness Reading | Hoffman Scratch Hardness |
| --- | --- |
| 1. 15 (5 min. after spray) | |
| 2. 26 (30 min. after spray) | 1,000 g. |
| 3. 30 (60 min. after spray) | 1,000 g. |

EXAMPLE 15

The following is an example of a polyisocyanate reacted with a combination of a polyamine and a polyalcohol. Apparently, the polyamine reacts with the polyisocyanate first setting up the film and then subsequently the polyalcohol reacts with the remaining groups of the polyisocyanate hardening the film.

| Ingredients | Parts by weight |
| --- | --- |
| Component A | |
| p,p'-methylenedianiline | 1 |
| Diethylene glycol | 1 |
| Toluene | 1 |
| Isopropanol | 1 |
| Methyl ethyl ketone | 1 |
| Component B | |
| Castor oil toluene diisocyanate condensate of Example 7, 50% solids | 1 |
| Toluene | 1 |
| Rate of spray: A. 7 g./15 sec.; B. 60 g./15 sec. | |

This reaction made a fast-curing hard film.

Various polyester polyisocyanates have been reacted with various polyamines or polyamide-amines by spraying from two guns, as shown in the following examples 16–19.

EXAMPLE 16

Component A Polyamide-amine from dimer acid methyl esters and methylene dianiline (example 5), 25 percent solids in methyl ethyl ketone Component B Castor oil-toluene diisocyanate (example 7), 25 percent solids in toluene Rate of spray: Two parts of Component A to three parts of Component B This example gave a very smooth film with a slightly waxy feel. The film had excellent flexibility and a little "bounciness." Sward hardness 1 mil dry film on glass 18 after 1 hour.

EXAMPLE 17

Component A Polyamide-amine from dimer acid methyl esters and methylene dianiline and higher homologs (example 6), 25 percent solids in methyl ethyl ketone Component B Castor oil-toluene diisocyanate (example 7), 25 percent solids in toluene Rate of spray: Two parts of Component A to three parts of Component B.

This example gave a film similar to that of example 16 but somewhat tougher. The film shows excellent wear. Sward hardness 20 after 2 hours, 32 overnight.

EXAMPLE 18

Component A Methylene dianiline 2 parts). 25 percent solids in methyl

Oleyl diamine* (1 part) ethyl ketone

* Formula—$CH_3(CH_2)_7CH$ $CH(CH_2)_8NH(CH_2)_3NH_2$ 1 part) ethylketone.

Component B Castor oil-toluene diisocyanate (example 7), 25 percent solids in toluene Rate of spray: One part of Component A to three parts of Component B.

This example gave a very fast reacting film but still smooth and hard. The film had a smooth waxy feel.

EXAMPLE 19

Component A Polamide-amine—same as Example 6 (dimer methyl esters +example crude methylene dianiline) 25 percent solids in methyl ethyl ketone Component B Reaction product 1 part crude methylene bis (4-phenylisocyanate) functionality 2.4 (NCO-10 Kaiser Chem. Co.) 1 part castor oil, 25 percent solids in toluene
Rate of spray: Two parts of Component A to three parts of Component B.

This formulation gave a slightly yellow, hard, very flexible, rather "bouncy" film, having some elastomeric properties.

EXAMPLE 20

Component A Same as example 19.
Component B
Step 1—Making an alkyd with a high hydroxy content.
9600 parts by weight of safflower oil
2775 parts by weight of trimethylol ethane
0.1 parts by weight of litharge
are heated with stirring under carbon dioxide atmosphere to 450° F. and held until alcoholysis (30 minutes). Then
1,893 parts by weight of isophthalic acid
733 parts by weight of benzoic acid
are added and the mixture is heated to 450° F. and a stream of carbon dioxide is used to carry off the water of estrification. After about 6 hours the acid number is under three and the reaction may be discontinued. Color Gardner 5, Viscosity— 11 Stokes, Acid valve—2.5.

Step 2—Making the toluene diisocyanate addition to the above alkyd
A mixture of 340 parts by weight of toluene diisocyanate and 340 parts by weight of toluene is placed in a 2-liter flask. This is stirred at room temperature, and to this is added a mixture of 670 parts by weight of the above alkyd and 670 parts by weight of toluene over a period of 1 hour. Viscosity — 0.5 Stokes, Color —Gardner 5.
Rate of Spray: A 1 part; B 1.5 parts
The spray made a clear, flexible hard film with following Sward hardness:

| | |
|---|---|
| 15 min. | 16 |
| 1 hour | 24 |

EXAMPLE 21

Component A: Methylene dianiline, one part, and three parts of methylene ethyl ketone, both by weight Component B:
Step 1 —Alcoholysis of safflower oil with pentaerythritol.
A mixture of 2,790 parts by weight of safflower oil 279 parts by weight of pentaerythritol and 0.6 parts by weight of calcium hydroxide is stirred and heated to 450° F. and held for 30 minutes for alcoholysis to take place.
Step 2
Toluene diisocyanate is added to the above product. A mixture of 223 parts by weight of toluene diisocyanate and 333 parts by weight of toluene is stirred in a reactor at room temperature and 444 parts by weight of the above pentaerythritol safflower product mixed with 333 parts by weight of toluene is added to the reactor in a 2 hour period. The temperature rises from 66° F. to 76° F. This reaction product has a viscosity of 0.22 Stokes and a Gardner color of 3.
Rate of Spray: A—1 part; B—1 part (25 percent in toluene)
The spray made a clear soft flexible film in a few minutes.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. The combination of:
   a substrate and a cured coating, wherein the cured coating comprises the reaction product of
   a. the Schiff's base reaction product of tung acrolein adduct with a lower polyamine, and
   b. a polyisocyanate chosen from the group consisting of the polyester polyisocyanates and unsubstituted polyisocyanates,
   with the ratio of amine groups to isocyanate groups lying in the range of 3:1 to 1:3.
2. The coating of claim 1 wherein said polyamine is a Schiff's base reaction product of the tung-acrolein adduct and triethylene tetramine.
3. The coating of claim 1 wherein the equivalents of the amine groups and the isocyanate groups are present in approximately equal amounts.
4. The coating of claim 1 wherein there is also a pigment carried by at least one of (a) or (b).

* * * * *